(12) United States Patent
Nor

(10) Patent No.: US 7,166,383 B2
(45) Date of Patent: Jan. 23, 2007

(54) ELECTRODE STRUCTURE FOR STACKED ALKALINE FUEL CELLS

(75) Inventor: Jiri Nor, Oakville (CA)

(73) Assignee: Astria Energi Inc., Mississauga (CA)

(*) Notice: Subject to any disclaimer, the term of this patent is extended or adjusted under 35 U.S.C. 154(b) by 0 days.

(21) Appl. No.: 11/004,988

(22) Filed: Dec. 7, 2004

(65) Prior Publication Data

US 2006/0286430 A1    Dec. 21, 2006

(51) Int. Cl.
*H01M 8/02*    (2006.01)

(52) U.S. Cl. ............... 429/38; 429/34; 429/39

(58) Field of Classification Search ............ 429/14, 429/34, 35, 38, 39, 46
See application file for complete search history.

(56) References Cited

U.S. PATENT DOCUMENTS

| | | | |
|---|---|---|---|
| 5,480,735 A | 1/1996 | Landsman et al. | |
| 6,790,551 B1 | 9/2004 | Venkatesan et al. | |
| 6,797,667 B1 | 9/2004 | Ruth et al. | |
| 2003/0059664 A1* | 3/2003 | Menjak et al. | 429/34 |
| 2004/0161652 A1 | 8/2004 | Ovshinsky et al. | |

* cited by examiner

*Primary Examiner*—Gregg Cantelmo
(74) *Attorney, Agent, or Firm*—Gowan Intellectual Property

(57) ABSTRACT

A flat electrode structure for use in alkaline fuel cell stacks has electrolyte and gas inlet and outlet manifolds, with the gas manifolds being at the sides of the electrode. There is at least one gas inlet manifold and one gas outlet manifold in each side frame, and electrolyte and gas flow channels formed in the top and bottom, and side frame members. Side-to-side gas flow of the fuel gas or oxidizer gas across the electrode face is effected, with bottom to top electrolyte flow. In another embodiment of electrode structure, an embedded metal frame around the electrode serves as a current collector while stiffening the frame so as to reduce thermal expansion.

13 Claims, 5 Drawing Sheets

ELECTRODE STRUCTURE FOR STACKED ALKALINE FUEL CELLS

FIELD OF THE INVENTION

This invention relates to alkaline fuel cells, and particularly to the flat electrode structures from which a stacked alkaline fuel cell is assembled. Specifically, the present invention provides for the design of flat electrode structures for use in stacked alkaline fuel cells which permit efficient and low loss gas flow across gas diffusion electrodes, and the flow of circulating alkaline electrolyte, through the stacked alkaline fuel cell. Another feature of the present invention provides for improved electrode contact with considerably reduced risk of electrode buckling during thermal cycling of the stacked alkaline fuel cell.

BACKGROUND OF THE INVENTION

Alkaline fuel cells have been known, at least in rudimentary form, since shortly after the turn of the 20th century. Indeed, alkaline fuel cells have found at least limited success and acceptance because of their use by NASA, particularly since the Apollo missions. Alkaline fuel cells were also used by NASA for the space shuttle Orbiter vehicles. However, there has been much greater commercialization of Proton Electrode Membrane (PEM) fuel cells for a variety of reasons that need not be discussed in detail here.

On the other hand, the market is once again turning to alkaline fuel cells because of several specific advantages that they have over PEM fuel cells. Those advantages include the fact that alkaline fuel cells can be manufactured without having to rely on precious or noble metal electrodes; and that the electrolyte is alkaline and not acidic, which leads to better electrochemical performance and generally broader operating temperatures than those of PEM fuel cells.

The general structure of alkaline fuel cells is quite simple. Typically, fluid channels are formed through the plastic electrode frames for the distribution of gas and electrolyte. Typically, the fuel gas is hydrogen, although it may also be such as methanol vapour, the oxidizer gas is oxygen or air, and the electrolyte is alkaline solution such as aqueous potassium hydroxide solution. One purpose of any design of electrode frames for alkaline fuel cells is to provide for even distribution of the flow of gases across the faces of the electrodes. However, the prior art alkaline fuel cells have had problems relating to the elimination of droplets of moisture which develop in the gas path. Prior art alkaline fuel cells also have had difficulty with respect to thermal stresses that may be caused by uneven currents, typically because of uneven gas flow, among other contributing factors. The present invention seeks to overcome those and other shortcomings of prior art alkaline fuel cells by providing for even distribution of the flow of gases across the face of the electrodes, and by providing design features which effectively eliminate unwanted buildup of droplets of condensate which may be contaminated with electrolyte running down the face of the electrodes.

The present invention also provides designs which reduce thermal stresses that may be caused by uneven currents as they flow through the electrode structures, and which are also caused by thermal cycling. That feature is particularly accomplished by the provision of a metal contact frame embedded in the plastic electrode frame so as not only to improve current collection in monopolar cells, but also so as to significantly reduce the thermal expansion of the plastic frame. This reduces stresses imposed on the electrode as well as stresses imposed on the inter-cell seal, and thereby contributes to improved tolerance of thermal cycling. This, in turn, provides for increased longevity of the stacked alkaline fuel cell structure.

It will be understood by those skilled in the art that the features of the present invention as they are described thereafter may be equally applicable to monopolar cell designs and, with appropriate amendments and alterations as may be required, to bipolar cell designs. Those terms are meant, in this case, particularly to describe stacked alkaline fuel cell structures where monopolar cell structures employ edge current collection, and bipolar cell structures where bipolar plates may be employed for cell interconnects.

The typical material from which plastic frames for flat electrode structures for use in alkaline fuel cells are manufactured is beyond the scope of the present invention, except as will be described hereafter with respect to the stiffness, modulus of elasticity, and coefficient of thermal expansion, of that material. Suffice it to say that such material may be either a thermoplastic material or a thermosetting material. In general, openings are formed through the thickness of the plastic frames so as to provide for passages which permit gas flow or electrolyte flow from one end of the stack structure to the other. A stacked alkaline electric fuel cell structure is assembled by placing flat electrode structures adjacent one to another, observing polarity of the electrodes being put into place, and securing them by such as adhesive, compression, welding and other well-known methods. Accordingly, such a stacked structure with openings in the plastic frames is said to have internal manifolding, as opposed to external manifolding, so that inlet and outlet conduits for gas and electrolyte can be connected to the entire stack structure.

In the design of alkaline fuel cells which employ a circulating electrolyte, the electrolyte enters each cell of the stack at the bottom thereof, and flows upwardly. Exit channels formed at the top of the cell in the frame structure therefore are typically designed so as to permit easy exit of any entrained gas bubbles there may be in the liquid electrolyte. Moreover, as a consequence of the electrochemical reaction which occurs within the fuel cell, water is created in the cell, and as a result condensation will typically form in and outside the electrolyte diffusion layer of any of the electrode structures. This, in turn, may lead to partial wetting and electrode "weeping", whereby droplets of condensate will contaminate the electrolyte as it runs across the gas face of the electrode. Regrettably, in some extreme cases, it is possible that electrolyte may find a path through imperfect electrode-to-frame seals, or cracks on the electrode surface. This, in turn, may lead to electrolyte leaks.

Any liquid which finds its way into gas spaces of the cells must be promptly removed in order to assure good access of the gas to the working surface of the electrode. This has typically meant in prior art alkaline fuel cells that the gas would flow from top to bottom of each of the individual cells, so as to carry the liquid out of the cell in a manner which provides for the least hydraulic resistance to the flow of fluid, namely downwardly with the assistance of gravity. A typical prior art cell structure provided for flat, thin gas spaces in the individual cells, having one or a plurality of exit slits at the bottom of the cell. However, the problem has been that such bottom slits may become blocked by drops of liquid which remain in place as a consequence of capillary forces. If there is a plurality of slits, and some of them become blocked, then there will be an uneven distribution of gas flow across the face of the electrode, resulting in weakened performance of that cell. If the main exit slit becomes blocked, then the entire cell will malfunction.

Moreover, typical prior art stacked alkaline fuel cell structures relied on parallel feed of gases, where the pressure differential between the inlet and outlet across any cell could be too small to overcome the capillary forces and to blow out the offending drop of liquid. If any one or more individual cells became blocked, such blockage might not be well noticed in the hydraulic behaviour of the stack, even though the electric behaviour may be compromised. This has led designers to arrive at somewhat complicated solutions in which groups of cells are cascaded so as to achieve high flow rates and high pressure differentials. In turn, this requires additional pumping power or, when a blocked cell can be electrically detected, increased gas flow and higher pressure for a short period of time so as to blow out the offending liquid by force.

DESCRIPTION OF THE PRIOR ART

Several patents and a patent application publication have been noted and are referred to simply because they provide for general teachings of alkaline fuel cell structure and electrodes, but otherwise are not relevant to the present invention.

Ovshinsky et al U.S. Patent Application Publication 2004/0161652, published Aug. 19, 2004, teaches an alkaline fuel cell pack having gravity fed electrolyte circulation and water management. Here, there is a non-forced electrolyte and air stream which circulates to the fuel cell pack as a result of thermal convection resulting from heat produced in the fuel cell at the hydrogen and air electrodes. The design is intended to eliminate the need for pumping devices.

Landsman et al U.S. Pat. No. 5,480,735, issued in Jan. 2, 1996, is concerned with the provision of electrodes for alkaline fuel cell, where the electrodes include a porous substrate and a catalyst layer. The catalyst layer includes catalyst particles, a hydrophobic binder, and hydrophilic catalytically inactive particles, whereby a network of liquid transport pathway is provided through the catalyst layer.

Venkatesan et al U.S. Pat. No. 6,790,551, issued Sep. 14, 2004, teaches oxygen electrodes which operate through the mechanism of redox couples in instant startup alkaline fuel cells. The redox couples provide multiple degrees of freedom in selecting the operating voltages available for the fuel cells. Thus, the oxygen electrodes provide a "buffer" or "charge" of oxidizer which is available within the oxygen electrode at all times.

Ruth et al U.S. Pat. No. 6,797,667, issued Sep. 28, 2004, provides a process whereby an anode catalyst for fuel cells may be prepared. Here, a platinum-ruthenium catalyst is prepared and provided, whereby a high tolerance to carbon monoxide poisoning of the fuel cell is achieved.

SUMMARY OF THE INVENTION

In accordance with one aspect of the present invention, there is provided a flat electrode structure for use in alkaline fuel cell stacks, where the fuel cell stack comprises a plurality of flat electrode structures placed side-by-side so as to have electrolyte inlet and outlet manifolds, fuel gas inlet and outlet manifolds, and oxidizer gas inlet and outlet manifolds throughout the length of the stack.

Each of the stacked flat electrode structures comprises a framed electrode having an electrode face for contact with the electrolyte and a respective one of the fuel gas or the oxidizer gas. The electrode is secured in a surround frame having top and bottom frame members and opposed side frame members. The electrolyte, fuel gas, and oxidizer gas manifolds are each respectively in fluid communication through the thickness of the frame members for external connection at the ends of the fuel cell stack to respective electrolyte, fuel gas, and oxidizer gas conduits.

The electrolyte inlet manifold in each flat electrode structure is formed through the thickness of the bottom frame member, and the electrolyte outlet manifold is formed through the thickness of the top frame member.

In each flat electrode structure, there is at least one fuel gas inlet manifold and one oxidizer outlet manifold formed through the thickness of one of the side frame members, and at least one oxidizer inlet manifold and at least one fuel gas outlet manifold formed through the thickness of the other of the frame members.

Also, in each flat electrode structure, the electrolyte inlet and outlet manifolds are in fluid communication with the electrode face through electrolyte flow channels formed in the surface of the top and bottom frame members at the same side of the electrode structure where the electrode face is located.

Still further, in each flat electrode structure, two electrolyte flow channels are formed in each of the top and bottom frame members so as to be in fluid communication with respective top and bottom corners of the respective electrode face.

Gas flow channels are formed in the surface of each of the side frame members of each flat electrode structure, so as to provide fluid communication between the respective electrode face and the respective fuel gas inlet and outlet manifolds or oxidizer inlet and outlet manifold. Thus, side-to-side gas flow of the respective fuel gas or oxidizer gas across the electrode face is effected.

The flat electrode structure may be such that the electrolyte flow channels are straight.

However, the electrolyte flow channels may follow a convoluted path from the respective corners of the electrode face to the respective electrolyte inlet or outlet manifold.

Indeed, typically, the convoluted path of the electrolytic flow channels is serpentine.

Moreover, the convoluted path of the electrolyte flow channels may be configured so as always to accommodate an upward flow of electrolyte and thereby so as to preclude the development of gas lock caused by trapped gas bubbles in the liquid column of electrolyte within the electrolyte flow channels.

Another feature of the flat electrode structure of the present invention is that the gas inlet and outlet manifolds are formed in each of the side frames, and their respective gas flow channels, are arranged in such a manner that there is fluid communication among the gas flow channels in one of the side frame members to the gas flow channels in the other of the side frame members.

The flat electrode structure may be such that there are at least two gas inlet and outlet manifolds formed in each of said side frame members, and they are arranged in alternative order; or they may be arranged in adjacent groups.

Typically, each of the gas flow channels has a height substantially equal to the height of the respective gas inlet or outlet manifold with which it is in direct fluid communication adjacent that respective gas inlet or outlet manifold, and has a greater height than the height of the respective gas inlet or outlet manifold at the end of the gas flow channel adjacent the electrode face.

The cross-section of each of the gas inlet and outlet manifolds may be essentially rectangular, having greater height than width. Moreover, the corners of each of said gas inlet and outlet manifolds are typically rounded.

It is usual that the lowest elevation of the bottommost gas outlet manifold is below the elevation of the bottom edge of the electrode face.

In another feature of the present invention, where the electrode face includes a metallic electric current collector member, each of the top and bottom frame members and each of the opposed side frame members are formed of a plastic material. There is a metal conductive foil member embedded in the plastic frame members so as to form a continuous embedded metal contact frame surrounding the electrode face and being in electrically conductive relationship to the current collector member.

The moduli of elasticity of the plastic material of the plastic frame members, and of the metal conductive foil member, are such that the metal material of the metal conductive foil member is typically at least 10 times or more stiffer than the plastic material of the plastic frame.

The plastic material of the plastic frame member may include a filler chosen from the group consisting of talc, alumina, silica, glass, kaolin, kaolinite, calcite, carbon, ceramic fillers, and mixtures thereof.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
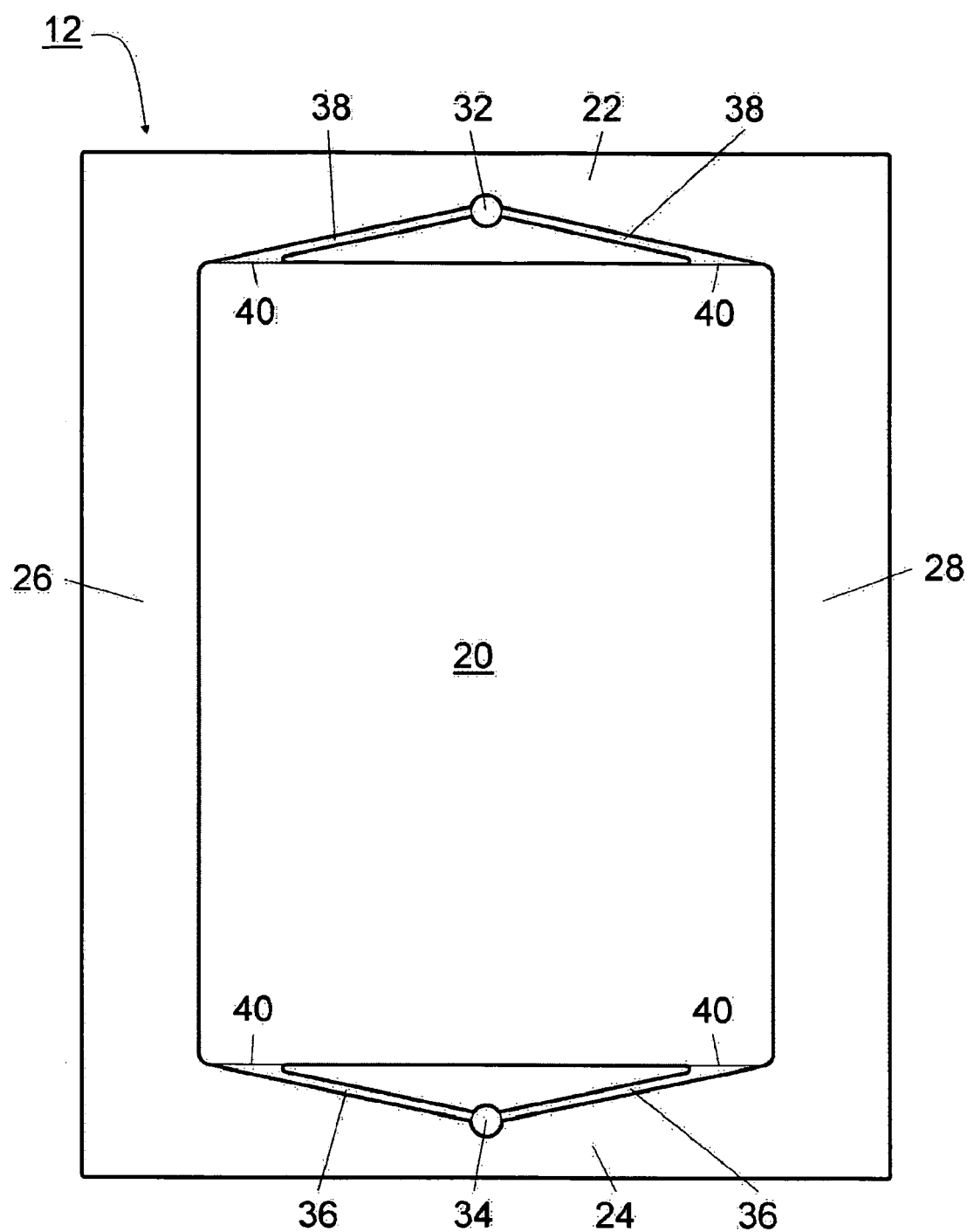
FIG. 1 is an elevation view of a typical flat electrode structure in keeping with the present invention, showing a simple configuration of electrolyte flow channels.

Turning first to FIG. 1, a first typical embodiment of a flat electrode structure which is suitable for use in alkaline fuel cells is shown at 12. Other typical embodiments of flat electrode structures which are suitable for use in alkaline fuel cells are shown at 14 in FIGS. 2A and 16 in FIG. 2B. However, the same reference numerals are used throughout all of the figures of drawings which are described hereafter to indicate the same feature of the flat electrode structures being discussed at any time.

Figure 2B:
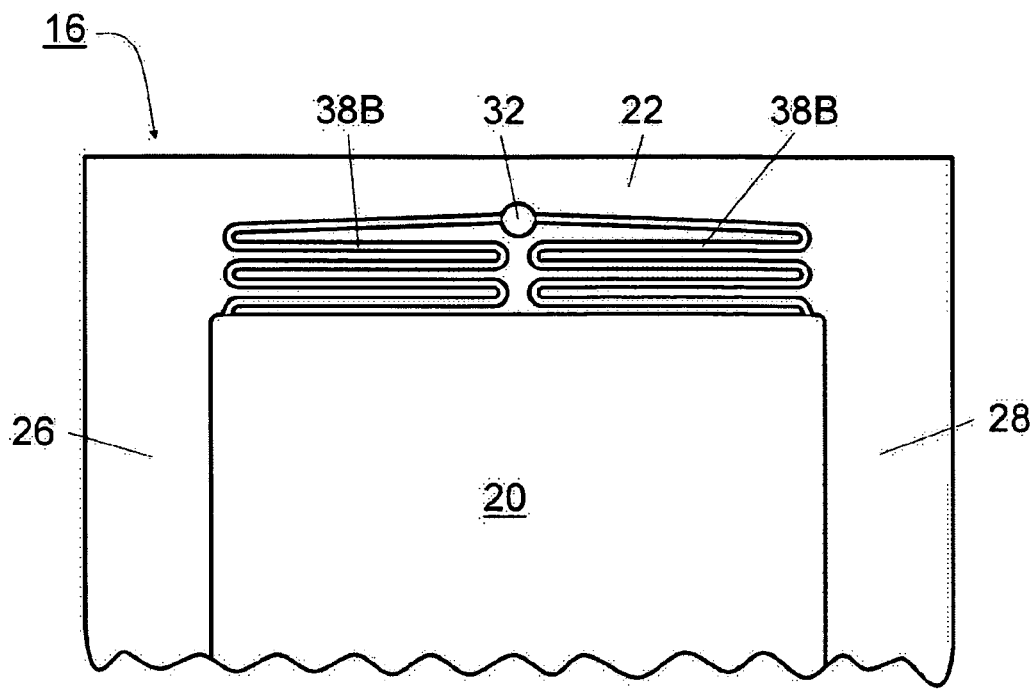
FIG. 2A and FIG. 2B show alternative configurations of electrolyte flow channels, it being understood that the other end of the flat electrode structures of those figures is identical to the end which is shown.
Figure 2A:
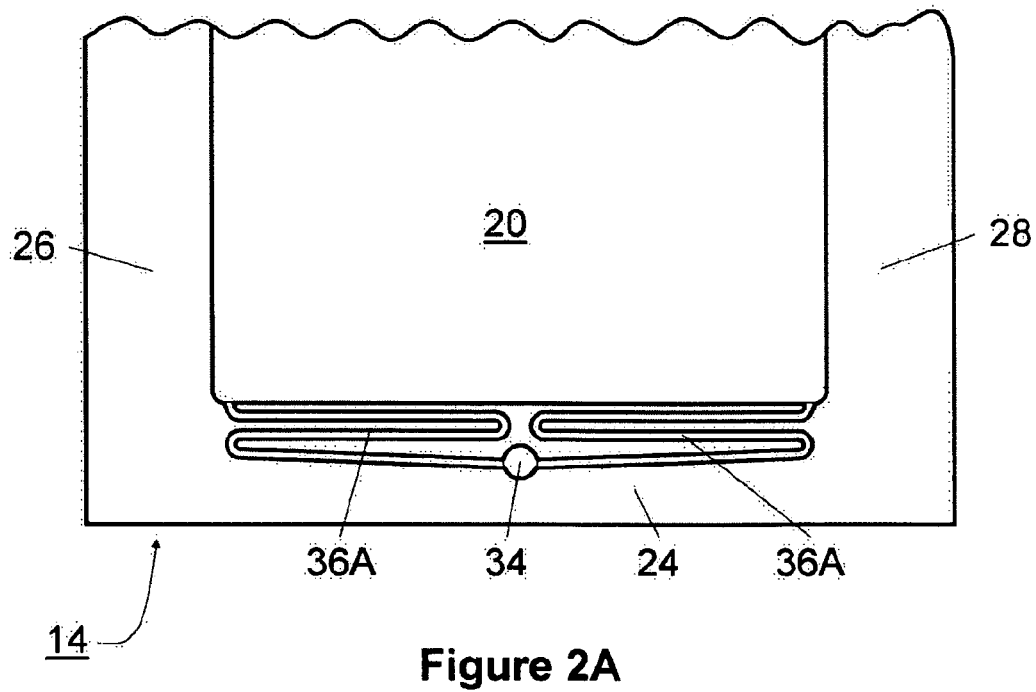
Figure 3:
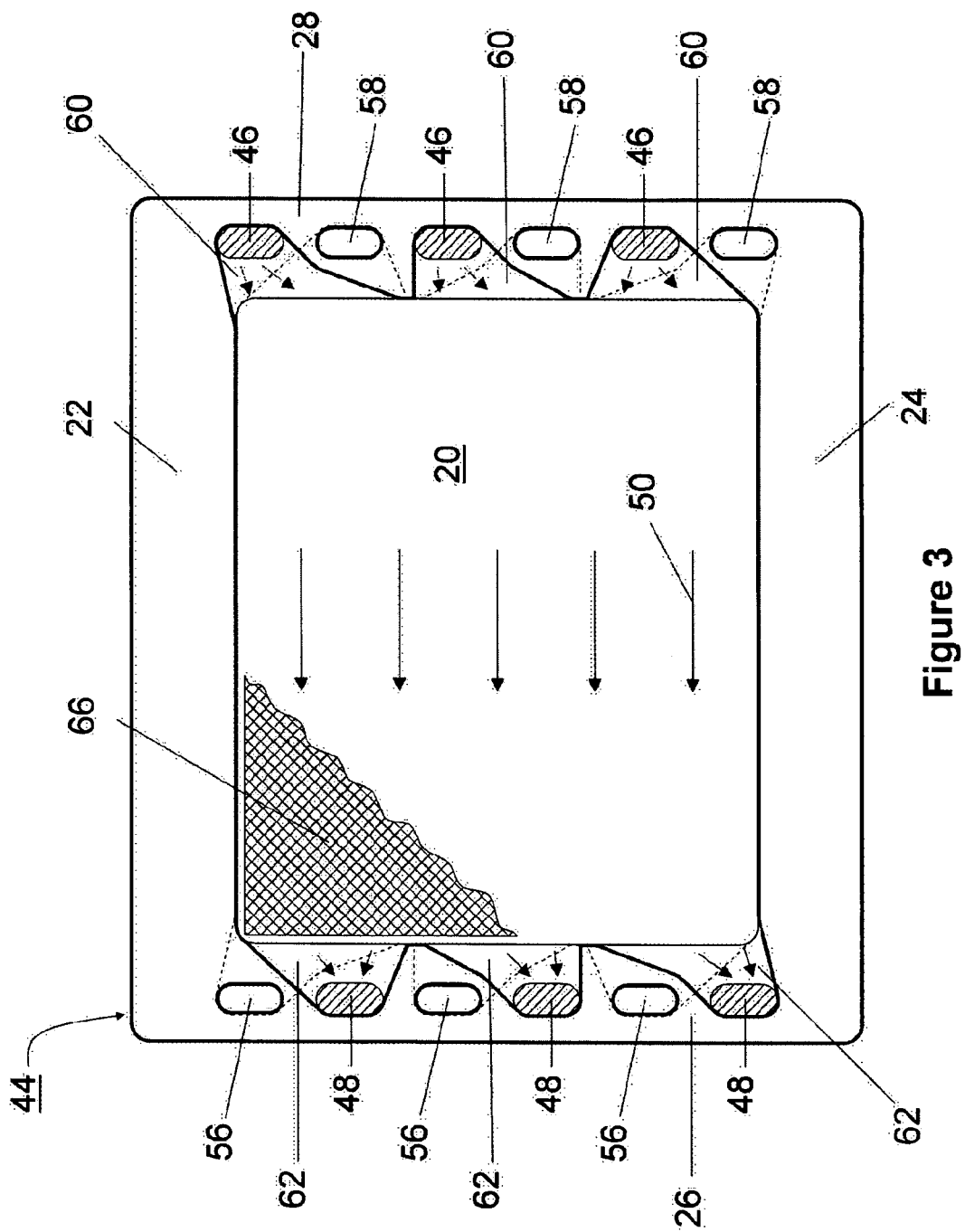
FIG. 3 is an elevation of another typical flat electrode structure in keeping with the present invention, showing a typical arrangement of gas flow manifolds and their associated gas flow channels.
Figure 4:
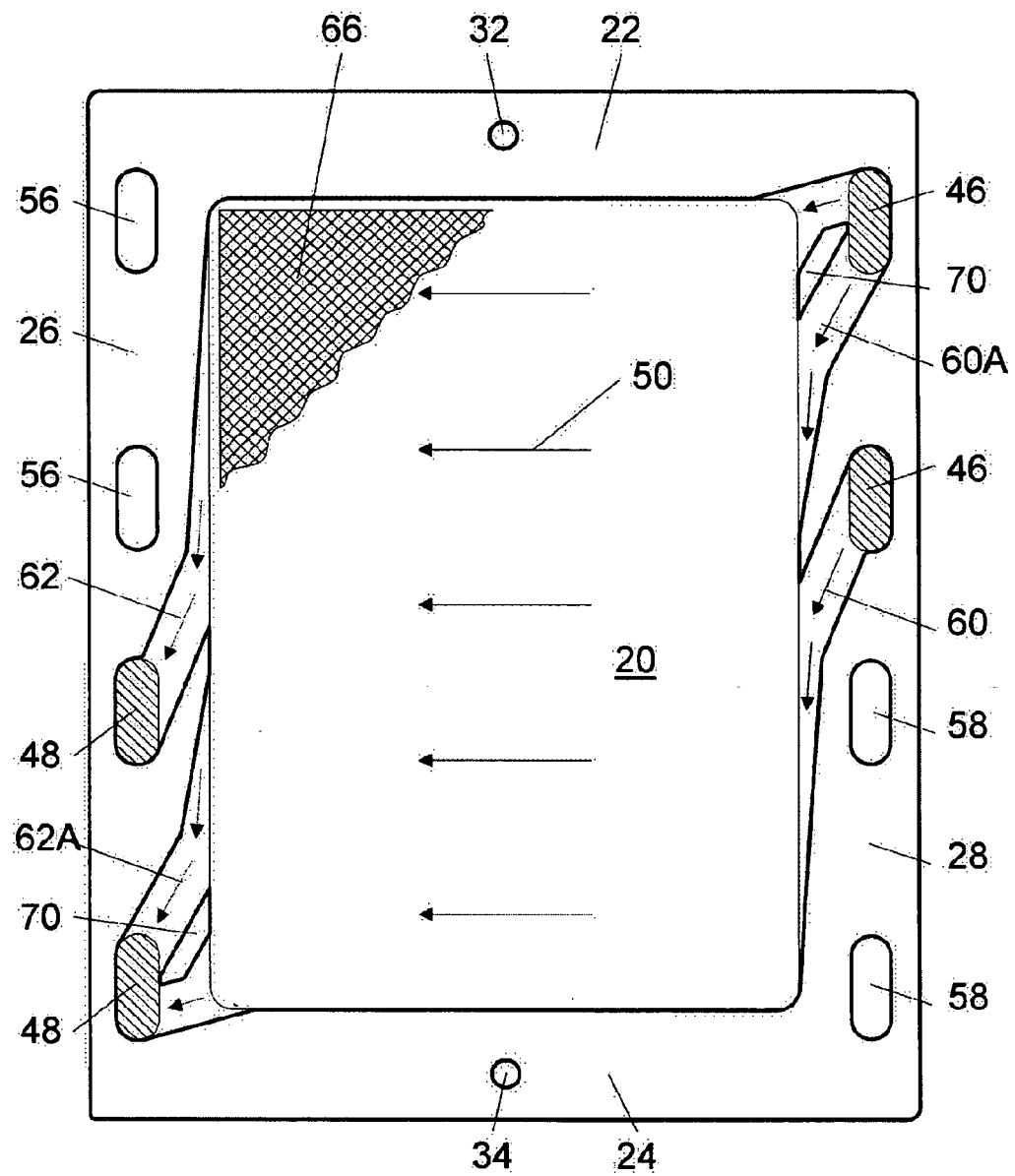
FIG. 4 is an elevation of a further typical flat electrode structure having an alternative arrangement of gas flow manifolds and their associated gas flow channels.

It will also be understood that the embodiments shown in FIGS. 1, 2A, and 2B, are intended only to show representative electrolyte inlet and outlet manifolds and electrolyte flow channels; and likewise, the embodiments shown in FIGS. 3 and 4 are intended only to show typical arrangements of fuel gas and oxidizer gas inlet and outlet manifolds and their associated gas flow channels. In other words, each of those figures has been highly simplified for purposes of clarity and illustration only.

Each flat electrode structure comprises a framed electrode which is shown generally at 20. Typically, the electrode structure is rectangular. The specific features, chemistry, and structure, of the electrodes 20 are outside the scope of this present invention. While electrolyte flow from the bottom to the top of the cell is known, the inventor herein has quite unexpectedly discovered that better and more efficient fuel cell operation is achieved when the gas flow of the fuel gas and oxidizer gases is horizontal, that is from side to side of each respective cell, across the electrode face of that cell. This is described in greater detail hereafter.

Of course, it will be understood that each electrode will have a working face that is designed in keeping with well known principles to interact with the electrolyte or the respective fuel gas or oxidizer gas.

Each electrode frame which surrounds the electrode has top and bottom frame members 22 and 24, and opposed side frame members 26 and 28. Located in the top frame member 22 is the electrolyte outlet manifold 32, which is formed through the thickness of the electrode frame. The electrolyte inlet manifold 34 is formed in the bottom frame member 24. Thus, it will be understood that electrolyte flow in the cell across the electrode face will be from bottom to top of the cell. Two inlet channels 38 and 36 are formed in each of the top and bottom frame members 22 and 24, and are referred to herein as electrolyte flow channels. It will be seen that the electrolyte flow channels are in fluid communication across the electrode face through flow channel faces 40. It will also be seen that the electrolyte flow channels communicate to the respective inlet and outlet manifolds 34 and 32 from the corners of the electrode face. Because an electrolyte flow within the cell is achieved as a consequence of both pumping and convection flow, wetting of the entire electrode face is assured. It will also be understood that the corner exits for the electrolyte into the electrolyte flow channels will help in the easy removal of entrained gas bubbles within the liquid electrolyte, even if the cell is leaned out of its vertical position.

It is known that electrolyte flow channels which are connected to common manifolds may present paths for parasitic currents. In order to keep those parasitic currents to a minimum, the resistance of the electrolyte channels should be reasonably high. The electrical resistance of the liquid column of electrolyte within an electrolyte flow channel is directly proportional to the length of the flow channel and inversely proportional to its cross-section. However, there may also be hydraulic considerations which limit the design choice as to how small the electrolyte flow channels may be, so it may be considered to be desirable to increase the length of the electrolyte flow channels by arranging them in a convoluted path. Typically, that path may be serpentine, as shown at flow channels 36A in FIG. 2A, and flow channels 38B in FIG. 2B. Of course, it has been noted that the opposite ends of the electrodes 14 and 16 shown in FIGS. 2A and 2B, respectively, will be the same as the end which is shown. The specific difference between the electrolyte flow channels 36A and 38B is that channels 38B are nearly twice as long as channels 36A. In any event, all of the electrolyte flow channels are in fluid communication with the respective electrolyte inlet and outlet manifolds 34 and 32.

It will also be understood that the design of any of the electrolyte flow channels is such that there is always an upward flow of electrolyte through the respective electrolyte flow channel so as to thereby preclude the development of any gas lock which might occur as a consequence of trapped gas bubbles in the liquid column of electrolyte within the electrolyte flow channels.

Turning now to FIG. 3, another typical configuration for a flat electrode structure in keeping with the present invention is shown. Here, for purposes of simplicity and clarity, consideration has not been given to the electrolyte flow channels and their respective inlet and outlet manifolds. Thus, the purpose of the following discussion is to explain the layout of gas manifolds in a fuel cell stack, and to show gas flow across the electrode face from side to side of the electrode.

The configuration of the embodiment of FIG. 3 comprises the same top and bottom frame members 22, 24 and side members 26, 28, which surround the electrode 20. What is shown in this figure particularly is gas flow of the fuel gas, which is the consumable fuel for the stacked alkaline fuel cell. In the embodiment shown, there are a plurality of fuel gas inlet manifolds 46 formed through the thickness of the right side frame member 28, and a plurality of fuel gas outlet manifolds 48 formed through the thickness of the left side frame member 26. Gas flow across the face of the electrode 20 is seen to be from right to left as shown by arrows 50 in this illustrative embodiment.

Moreover, it will be understood that there is fluid communication among the inlet gas manifolds 46 and the outlet gas manifolds 48, although the gas flow across the face of the electrode 20 tends to be linear and laminar. It will also be understood that, in some circumstance, there may be only a single gas flow manifold for each of the fuel gas and oxidizer gas formed through the thickness of the side frame members at each side of the electrode frame structure.

It is also seen in FIG. 3 that there are a plurality of oxidizer gas inlet manifolds 56 formed through the thickness of the left side frame member 26, and a plurality of oxidizer gas outlet manifolds 58 formed through the thickness of the right side frame member 26. Those skilled in the art will understand, of course, that the oxidizer gas side of the electrode, or more particularly an oxidizer gas electrode frame having the appropriate electrode therein, will be on the back side of the electrode frame 44. It will also be understood, of course, that the oxidizer gas flow will be similar to that which is shown in FIG. 3 but in the opposite direction, that is from left to right as seen in the figure.

FIG. 3 shows the fuel gas inlet and outlet manifolds and the oxidizer gas inlet and outlet manifolds being arranged in alternative order. That is, between a pair of fuel gas inlet manifolds 46 there is formed through the thickness of the right side frame 28 an oxidizer gas outlet manifold 58. Inspection shows the same arrangement on the left side frame 26, but in the reverse order so that the topmost manifold formed through the thickness of the left side frame member 26 is an oxidizer gas inlet manifold, and the topmost manifold formed through the thickness of the right side frame member 28 is a fuel gas inlet manifold, with the bottommost manifolds formed through the thicknesses of the left and right side frame members 26 and 28 being a fuel gas outlet manifold and an oxidizer gas outlet manifold, respectively.

Referring briefly to FIG. 4, an alternative arrangement for the inlet and outlet gas manifolds for the fuel gas and for the oxidizer gas is shown. Here, the two fuel gas inlet manifolds 46 are shown as being adjacent to one another in the right side frame member 28, and the two oxidizer gas outlet manifolds 58 are also shown as being adjacent one to another in the right side frame member 28. A similar arrangement is made in the left side frame member 26 for the oxidizer gas inlet manifolds 56 and the fuel gas outlet manifolds 48. Otherwise, the same principles apply as to the functionality of the structure as it relates to both the electrolyte flow manifolds and the gas flow manifolds.

However, a further feature is also shown in FIGS. 3 and 4. What is shown in those figures are gas flow channels 60 and 62, which, in this case, are the gas flow channels which provide for fuel gas flow from the fuel gas inlet manifolds 46 to the fuel gas outlet manifolds 48. It will be understood, once again, that there is fluid communication among the inlet fuel gas flow channels 60 and the outlet fuel gas flow channels 62, and that the fuel gas flow is essentially linear and laminar across the electrode face.

It will also be understood that the horizontal flow of gas in the cell will not significantly affect the flow of liquid effluent. Droplets of condensate which may be contaminated with electrolyte will eventually find their way to the bottom of the cell through the diffuser mat 66, which is shown for purposes of this discussion in FIG. 3. In the case of a bipolar plate, the liquid will find its way to the bottom of the cell through gas spaces found in a bipolar plate.

What is important to note is that the design and placement of the gas manifolds, particularly the bottommost gas manifolds, and of the gas flow channels formed in the respective left and right side frame members, are arranged so as to assure that what liquid collects at the bottom of the cell will eventually find its way out of the stack. This is accomplished by the fact that the lowest elevation of the bottommost gas outlet manifolds 48, 58 are below the elevation of the bottom edge of the electrode face 20.

Other design features are also provided. They include the fact that each of the respective gas inlet and outlet manifolds 46, 48, 56, 58 is configured so as to have a greater height than width. Moreover, typically the corners of each of the gas inlet and outlet manifolds are rounded; and this assures liquid flow particularly from the bottommost gas outlet manifolds 48, 58.

The design of each of the gas flow channels provides diffuser effect. This is accomplished by having the height of the gas flow channels to be essentially the same as the height of the respective gas flow manifold with which they are in direct fluid communication. However, the other end of each of the gas flow channels which is adjacent the electrode face has a greater height than the manifold end of the gas flow channels. This has the salutary effect of providing for a more evenly distributed gas flow across the entire height of the electrode face, while reducing the exit pressure and speed of the fuel gas or oxidizer gas as they flow from the respective gas inlet manifolds 46 or 56.

The gas flow channels 60A and 62A, as they are shown in FIG. 4, are seen to have splitters 70, by which more linear flow of the gas is assured. Moreover, the arrangement of the gas flow channels as shown in FIG. 4 accommodates the arrangement where the inlet and outlet gas manifolds are arranged in adjacent pairs, which simplifies the design of the end plates for the stack of flat electrode structures in keeping with the present invention.

Typically, the depth of the gas flow channels as they are formed in the faces of the respective side frame members of the electrode structures in keeping with the present invention may be in the range of from 0.5 to 1.0 mm. Thus, the increased height of the gas flow channels in the area in adjacent the electrode face will be understood to effect gas flow in a favorable manner.

Moreover, any liquid which may collect and be retained in the gas flow channels as a consequence of capillary action will, in any event, sit at the bottom of the gas flow channel. Because the gas flow is directed horizontally, what liquid may be collected and retained will be at the bottom of the channels; and it will be understood that the height of the channels will be significantly greater than the "capillary elevation" which is a function of the wetting properties of the liquid on the capillary wall and the dimensions of the capillary. In practical terms, this means that all of the manifolds with the exception of the two lowest outlet manifolds will remain dry and unobscured most of the time. Indeed, while most previous designs of stacked alkaline fuel cells will reluctantly accommodate less then 50% blockage of gas manifolds, and cells fail when blockage exceeds that percentage, it has been observed that there is typically considerably less than 20% blockage of only the bottommost gas outlet manifolds and no blockage of higher manifolds in stacked alkaline fuel cells in keeping with the present invention.

It has also been observed that operation of a stacked alkaline fuel cell having electrode structures more or less in keeping with the configuration of FIG. 4 has shown remarkably good gas flow distribution, with a 60% performance improvement over earlier top-to-bottom designs.

Figure 5:
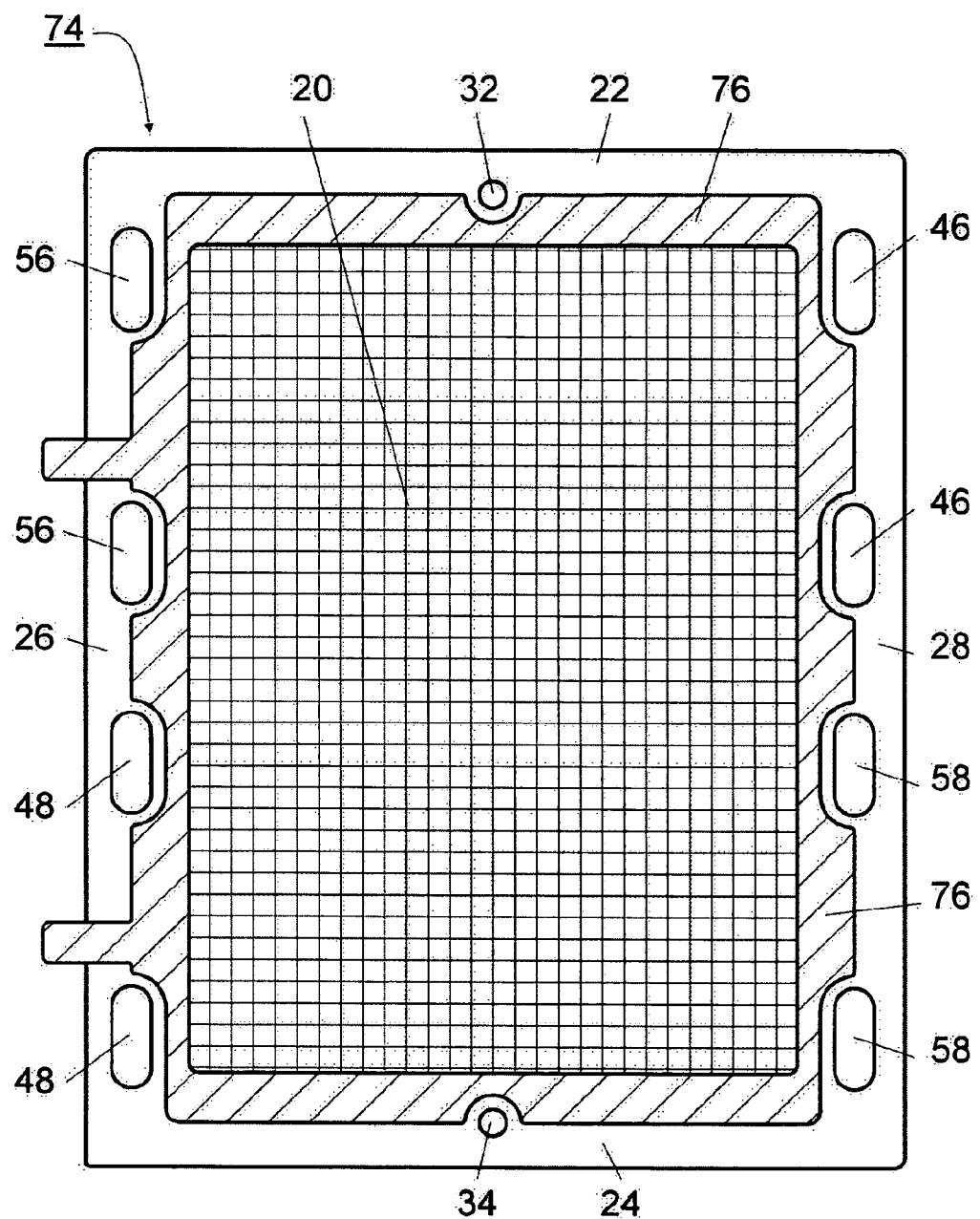
FIG. 5 is an elevation view of a further typical flat electrode structure in keeping with another feature of the present invention whereby deformation as a consequence of thermal cycling is alleviated.

Referring now to FIG. 5, an improved electrode structure is shown which will significantly reduce thermal expansion of the electrode cell structure during thermal cycling of the fuel cell, and which thereby reduces the stresses that are imposed on the electrode and its seal.

Typically, a monopolar flat electrode structure has a current collector which is usually a metal screen or mesh, and in prior art designs, that current collector would extend through the plastic frame to the outside. Another arrangement has been to provide a single metal contact embedded in the frame and attached to one side of the electrode. No matter what arrangement was made, there was a compromise between resistive losses in the current collector, the weight of the current collector, and its cost.

Still further, the plastic material of the frame which surrounds the electrode may exhibit several times higher coefficient of thermal expansion than the electrode material itself. It will be seen, therefore, that changes of temperature during thermal cycling could lead to stressing the bond and seal between the electrode and the frame, which in turn would eventually lead to cracks in the electrode or buckling of the electrode, and in any event to premature failure. It will be kept in mind that the relative strength of the frame is much greater than that of the rather delicate mesh in the electrode, so that stretching of the electrode at increased temperature beyond its limit of elasticity would lead to buckling when the electrode cools.

It will also be kept in mind that the plastic material of the frame structures may have a filler, such as talc, alumina, silica, glass, kaolin, kaolinite, calcite, carbon, ceramic fillers, and mixtures thereof.

FIG. 5 shows an electrode structure 74 having a configuration which is, in general, similar to that of FIG. 4. However, this electrode structure further includes a conductive metal foil member 76, which is typically copper but may be other electrically conductive metals, and which is embedded within the plastic frame member 22, 24, 26, 28. It will be seen that the conductive foil metal member 76 is a continuous embedded metal contact frame which surrounds the electrode face. It will be understood that the embedded metal contact frame is in electrically conductive relationship to the current collector member of the electrode 20, and is attached thereto by such means as spot welding, soldering, swaging, and so on as is well known to those skilled in the art. In any event, the presence of the continuous embedded metal contact frame 76 provides for much improved current collection and reduced resistive losses. Also, in keeping with a feature of the present invention whereby thermal stability of the electrode structure is achieved, the presence of the continuous embedded metal contact frame 76 provides for improved mechanical stability during thermal cycling, thereby resulting in reduced wear and longer life.

Indeed, a relatively small metal element will achieve the desired effect. For example:

The modulus of elasticity of the metal contact material is $1.15 \times 10^6$ kg/cm$^2$, and the modulus of elasticity of the plastic material of the frame is $0.018 \times 10^6$ kg/cm$^2$. The ratio of the two is $1.15/0.018 = 63.9$. That leads to the conclusion that the metal material is approximately 64 times stiffer than the plastic material.

Moreover, the coefficient of thermal expansion of the plastic material is 70 ppm/degree C.; and the coefficient of thermal expansion of the metal material is approximately 16 ppm/degree C. Even if the metal and plastic materials were to be warmed up by 1° C., then the metal will increase its length by approximately 16 ppm, while the plastic will increase its length by approximately 70 ppm. Since the continuous metal contact frame 76 is embedded in the plastic frame member 22, 24, 26, 28, they are bonded one to the other. Thus, the metal will restrict the elongation of the plastic, and the plastic will pull or to try to stretch the metal, until such time as they reach a compromise or equilibrium.

It can be shown that if the metal part stretches by $\Delta e_1$ and the plastic compresses by $\Delta e_2$ then the following ratio is relevant:

$$\frac{\Delta e_1}{\Delta e_2} = \frac{A_2 M_2}{A_1 M_1}$$

where $A_1$, $A_2$ are the cross-sectional areas of the two components, and $M_1$, $M_2$ are their respective moduli of elasticity. At the same time, the difference of unrestricted thermal elongation of the two components equals the sum of the elastic elongation of the first part plus elastic compression of the second part, giving rise to the following relationships:

$$\Delta e = e_2 - e_1 = \Delta e_1 + \Delta e_2$$

$$\Delta e = 70 - 16 = 54 \text{ ppm}$$

In an exemplary electrode structure in keeping with the present invention, the cross-section of the plastic top and bottom frame members, and the side frame members, is $20 \times 2 = 40$ mm$^2$; and the cross-section the conductive foil metal member is $8 \times 0.5 = 4$ mm$^2$. Then the ratio is:

$$\frac{\Delta e_1}{\Delta e_2} = \frac{40 \times 0.018 \times 10^6}{4 \times 1.15 \times 10^6} = 0.156$$

In other words, the material of the plastic top and bottom frame members, and the side frame members, will yield six times more than the relatively thin conductive foil metal member. Further calculation yields:

$\Delta e_1 = 7.3$ ppm and $\Delta e_2 = 46.7$ ppm

The net result is that the composite part will elongate only by

16+7.3=70−46.7=23.3 ppm, which is compatible with the material of the electrode over a wide range of temperatures.

Other modifications and alterations may be used in the design and manufacture of the fuel cell electrode structures of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A flat electrode structure for use in alkaline fuel cell stacks, where the fuel cell stack comprises a plurality of flat electrode structures placed side-by-side so as to have electrolyte inlet and outlet manifolds, fuel gas inlet and outlet manifolds, and oxidizer gas inlet and outlet manifolds throughout the length of the stack;

each of said stacked flat electrode structures comprising a framed electrode having an electrode face for contact with said electrolyte and a respective one of said fuel gas or said oxidizer gas, and being secured in a surround frame having top and bottom frame members and opposed side frame members, and wherein the electrolyte, fuel gas, and oxidizer gas manifolds are each respectively in fluid communication through the thickness of the frame members for external connection at the ends of the fuel cell stack to respective electrolyte, fuel gas, and oxidizer gas conduits;

wherein the electrolyte inlet manifold in each flat electrode structure is formed through the thickness of the bottom frame member, and the electrolyte outlet manifold is formed through the thickness of the top frame member;

wherein, in each flat electrode structure, there is at least one fuel gas inlet manifold and at least one oxidizer gas outlet manifold formed through the thickness of one of said side frame members, and at least one oxidizer gas inlet manifold and at least one fuel gas outlet manifold formed through the thickness of the other of said frame members;

wherein, in each flat electrode structure, said electrolyte inlet and outlet manifolds are in fluid communication with the electrode face through electrolyte flow channels formed in the surface of the top and bottom frame members at the same side of said electrode structure where the electrode face is located;

wherein, in each flat electrode structure, two electrolyte flow channels are formed in each of said top and bottom frame members so as to be in fluid communication with respective top and bottom corners of the respective electrode face; and wherein, in each flat electrode structure, gas flow channels are formed in the surface of each of said side frame members to provide fluid communication between the respective electrode face and the respective at least one fuel gas inlet and outlet manifold or oxidizer gas inlet and outlet manifold, whereby side-to-side gas flow of the respective fuel gas or oxidizer gas across the electrode face is effected.

2. The flat electrode structure of claim 1, wherein said framed electrode is rectangular.

3. The flat electrode structure of claim 1, wherein said electrolyte flow channels are straight.

4. The flat electrode structure of claim 1, wherein said electrolyte flow channels follow a convoluted path from the respective corners of the electrode face to the respective electrolyte inlet and outlet manifold.

5. The flat electrode structure of claim 4, wherein the convoluted path of said electrolytic flow channels is serpentine.

6. The flat electrode structure of claim 4, wherein the convoluted path of said electrolyte flow channels is configured so as always to accommodate an upward flow of electrolyte and thereby so as to preclude the development of gas lock caused by trapped gas bubbles in the liquid column of electrolyte within said electrolyte flow channels.

7. The flat electrode structure of claim 1, wherein said gas inlet and outlet manifolds formed in each of said side frames, and their respective gas flow channels, are arranged in such a manner that there is fluid communication among the respective gas flow channels in one of said side frame members to the respective gas flow channels in the other of said side frame members.

8. The flat electrode structure of claim 7, wherein there are at least two gas inlet and outlet manifolds formed in each of said side frame members, which are arranged in alternative order.

9. The flat electrode structure of claim 7, wherein there are at least two gas inlet and outlet manifolds formed in each of said side frame members, which are arranged in adjacent groups.

10. The flat electrode structure of claim 7, wherein each of said gas flow channels has a height substantially equal to the height of the respective gas inlet or outlet manifold with which it is in direct fluid communication adjacent that respective gas inlet or outlet manifold, and has a greater height than the height of the respective gas inlet or outlet manifold at the end of the gas flow channel adjacent said electrode face.

11. The flat electrode structure of claim 7, wherein the cross-section of each of said gas inlet and outlet manifolds is essentially rectangular, having greater height than width.

12. The flat electrode structure of claim 11, wherein at least the bottom portion of each of said gas inlet and outlet manifolds is rounded.

13. The flat electrode structure of claim 7, wherein the lowest elevation of the bottommost gas outlet manifold is below the elevation of the bottom edge of said electrode face.

* * * * *

UNITED STATES PATENT AND TRADEMARK OFFICE
CERTIFICATE OF CORRECTION

| | | |
|---|---|---|
| PATENT NO. | : 7,166,383 B2 | Page 1 of 1 |
| APPLICATION NO. | : 11/004988 | |
| DATED | : January 23, 2007 | |
| INVENTOR(S) | : Nor | |

It is certified that error appears in the above-identified patent and that said Letters Patent is hereby corrected as shown below:

On the title page item (73), "Astria Energi Inc.," should read --Astris Energi Inc.,--

Signed and Sealed this

Tenth Day of April, 2007

JON W. DUDAS
*Director of the United States Patent and Trademark Office*